United States Patent
Ekström et al.

(10) Patent No.: US 8,387,949 B2
(45) Date of Patent: Mar. 5, 2013

(54) COAXIAL COUPLING WITH BY-PASS VALVE AND COUPLING MECHANISM WITH BAYONETTE FORM

(75) Inventors: Jörgen Ekström, Skövde (SE); Lars-Erik Svensson, Skara (SE)

(73) Assignee: Cejn Aktiebolag (SE)

( * ) Notice: Subject to any disclaimer, the term of this patent is extended or adjusted under 35 U.S.C. 154(b) by 541 days.

(21) Appl. No.: 12/595,181

(22) PCT Filed: Apr. 15, 2008

(86) PCT No.: PCT/SE2008/050423
§ 371 (c)(1),
(2), (4) Date: Dec. 28, 2009

(87) PCT Pub. No.: WO2008/130311
PCT Pub. Date: Oct. 30, 2008

(65) Prior Publication Data
US 2010/0133457 A1 Jun. 3, 2010

Related U.S. Application Data

(60) Provisional application No. 60/912,441, filed on Apr. 18, 2007.

(30) Foreign Application Priority Data

Apr. 18, 2007 (SE) ...................... 0700955

(51) Int. Cl.
*F16L 37/28* (2006.01)
(52) U.S. Cl. ...................... 251/149.6; 251/146; 251/148; 251/149.9; 137/614.03; 137/614.05
(58) Field of Classification Search .................. 251/146, 251/148, 149–149.9; 137/614.02–614.06
See application file for complete search history.

(56) References Cited

U.S. PATENT DOCUMENTS 2,304,390 A * 12/1942 Wolfram .................. 137/614.03
2,509,444 A * 5/1950 Mitchell .................. 137/614.04
(Continued)

FOREIGN PATENT DOCUMENTS

EP 0074991 B1 10/1985
GB 541842 A 12/1941
(Continued)

OTHER PUBLICATIONS

"International Application Serial No. PCT/SE2008/050423, International Search Report mailed Jul. 11, 2008", 3 pgs.
"International Application Serial No. PCT/SE2008/050423, Written Opinion mailed Jul. 11, 2008", 3 pgs.

*Primary Examiner* — John K Fristoe, Jr.
*Assistant Examiner* — Jessica Cahill
(74) *Attorney, Agent, or Firm* — Schwegman Lundberg & Woessner, P.A.

(57) ABSTRACT

The invention relates to a coaxial coupling which comprises a male part (501) and a female part (502) and comprises a bypass valve (218) so that the female part (502) can be decoupled from the male part (501) while pressurized fluid passes through the female part (502). The nipple pipe (105) of the male part (501) pushes a spring-loaded valve (218) in the female part (502) over said rear holes (301) in the inner pipe (2) of the female part. The female part (502) has a rotatable locking sleeve (207), which is coupled to a sleeve (214) accommodating pins (213). The nipple pipe body (104) has helical grooves (100), wherein, upon coupling and rotation of the locking sleeve (207), the pins (213), through rotation of the pins (213), when they fall into the grooves (100), catch in the walls of the grooves (100) and cause the nipple pipe body (104) of the male part to be pulled into the female part (502), one end of the inner pipe (2) meets a relief valve (113) of the male part (501) and opens the relief valve (113), and pressurized oil is discharged against the valve of the female part (502) prior to continued opening of valves (115, 122) in the nipple pipe body (104).

5 Claims, 6 Drawing Sheets

U.S. PATENT DOCUMENTS

| | | | | |
|---|---|---|---|---|
| 3,482,602 A | * | 12/1969 | Jarnagan et al. | 137/614.03 |
| 3,625,251 A | * | 12/1971 | Nelson | 137/614.04 |
| 5,092,364 A | * | 3/1992 | Mullins | 137/614.05 |
| 5,738,143 A | * | 4/1998 | Faughn | 137/614.03 |
| 6,158,717 A | * | 12/2000 | Van Scyoc et al. | 251/149.6 |
| 7,114,703 B2 | * | 10/2006 | Ciesielka | 251/344 |
| 7,584,764 B2 | * | 9/2009 | Maldavs | 137/15.18 |

FOREIGN PATENT DOCUMENTS

| | | |
|---|---|---|
| GB | 647299 A | 12/1950 |
| GB | 2069083 A | 8/1981 |

\* cited by examiner

COAXIAL COUPLING WITH BY-PASS VALVE AND COUPLING MECHANISM WITH BAYONETTE FORM

RELATED APPLICATIONS

This application is a nationalization under 35 U.S.C. 371 of PCT/SE2008/050423, filed Apr. 15, 2008 and published as WO 2008/130311 A1 on Oct. 30, 2008, which claimed priority under 35 U.S.C. 119 to Sweden Patent Application Serial No. 0700955-8, filed Apr. 18, 2007; and under 35 U.S.C. 119(e) to U.S. Provisional Patent Application No. 60/912,441, filed Apr. 18, 2007; which applications and publication are incorporated herein by reference and made a part hereof.

TECHNICAL FIELD

The present invention relates to a coaxial coupling according to the preamble to claim 1, which is used to couple together a pressure line and a return line for the transport of fluid, such as liquid or gas.

The invention especially relates to coaxial couplings which are used by rescue personnel at an accident. The coupling must allow a cutting tool and a pressure source, for example, to be connected up quickly.

The pressure source therefore feeds pressurized fluid to the tool and the fluid is fed via the coupling back to the pressure source.

BACKGROUND ART

The Applicant has refined the approved EP patent for Strömdahl relating to a coaxial coupling, published approval in European Patent Gazette 02.10.85 Bulletin 85/40 (publication number EP 0 074 991 B1).

One object of Strömdahl's coaxial coupling is to produce a coaxial hose coupling for a coaxial hose, which allows one coupling half, which at the time of connection is coupled to a pressure-generating pump or compressor, to be rapidly connected up to the other coupling half by manual means.

The structure of the coaxial coupling allows free rotation of one coupling half in relation to the other one.

Another object of Strömdahl's construction is to produce a coaxial coupling, the component parts of which are of simple construction from the production engineering aspect, comprising simple compression springs and substantially rotationally symmetrical parts with cylindrical and conical faces with common principal axis and flat faces.

GB 2 069 083 shows a male part which must be rotated relative to a female part in order to disconnect the coupling. A safety sleeve with L-shaped grooves is fastened to the female part, by means of which grooves the male part is locked in place. The safety sleeve serves to prevent the male part from uncontrolledly flying out of the female part due to excess pressure in the female part.

U.S. Pat. No. 647,299 shows a coupling having a male part with pins, which are rotated in bayonet grooves in a locking sleeve fastened in the female part in order to bring the two coupling parts together. Locking spikes are decoupled from the male part by means of a predetermined axial force upon the coupling parts, so that the male part can rotate out of the female part.

GB 541842 shows a one-way coupling having a male part comprising a non-return valve for pressurized air. A bayonet coupling is designed to bring the two coupling parts together. The female part has a fastened guide sleeve with grooves for a bayonet coupling and the male part has pins. In the connection, the whole of the female part with valve seat is screwed onto the male part.

A drawback with known coaxial couplings is that, if a cold hydraulic tool with nipple (not coupled together with the coupling) is left in the sun, then this is warmed up. The hydraulic oil in the nipple expands and the enclosed pressure increases. This pressure can be up to a few hundred bar, which makes coupling together impossible without the use of a special tool to "emergency open" some valve and discharge the pressure into the open air. This can adversely affect the rescue work.

A further drawback with known coaxial couplings is that, since the coupling (the female part) is pressurized, when a pressurizing pump is connected to the female part, a rapid-action coupling together is made impossible without a large force having to be manually applied. This can result in a large number of persons having to join forces, which is inefficient in a motor vehicle accident, for example, and in cutting tools having to be connected up. The drawback is therefore that one cannot manage to force the coaxial coupling together like a traditional rapid-action coupling.

There is therefore a desire to improve the working efficiency at the site of an accident.

DISCLOSURE OF INVENTION

The abovementioned problems have been solved by the characteristic features specified in claim 1.

In this way, a coaxial coupling for highly pressurized hydraulic oil has been produced and any fluid of the male part which may have been expanded by heat from the sun can "hiss" out to the space present in the female part. Oil is thus collected in the coupling without spillage and a user does not need to use as much force to couple together the coupling when the sun warms up the exposed male part, generating high pressure in the oil contained therein. As a result of the coupling and interlocking mechanism, a user can easily couple together the female part and the male part, producing a coupling by rotation of the locking sleeve.

The number of pins is preferably two.

Alternatively, said fluid is hydraulic oil.

Expediently, the male part is coupled to a rescue tool. The rescue personnel can thus couple a tool to the female part with one simple maneuver.

Alternatively, a safety valve is configured as a collar arranged between an inner nipple pipe and the shell surface of a sealing cone facing toward the nipple pipe. The collar acts as a non-return valve and lets through pressurized oil only in one direction, that is to say in the direction from the return duct to the pressure duct.

Expediently, the male part is coupled to a hydraulically operated tool.

BRIEF DESCRIPTION OF DRAWINGS

The present invention will now be described with the aid of examples with reference to the appended schematic drawings, in which:

FIG. 4b shows a cross section of the male part in FIG. 4a;

MODES FOR CARRYING OUT THE INVENTION

Figure 1:
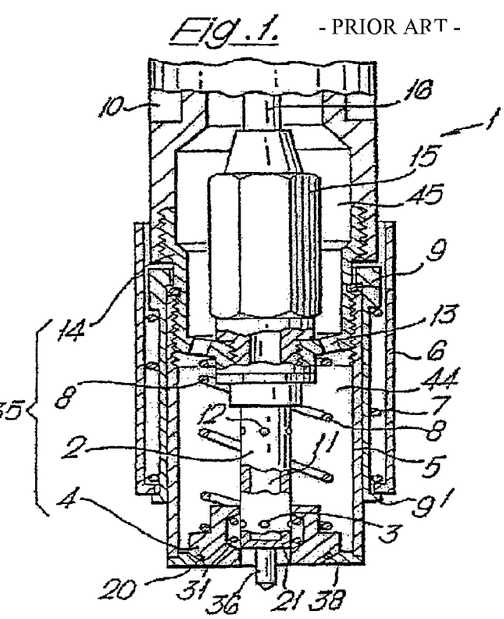
FIG. 1 shows a longitudinal section through the male part of a known coaxial coupling.
Figure 2:
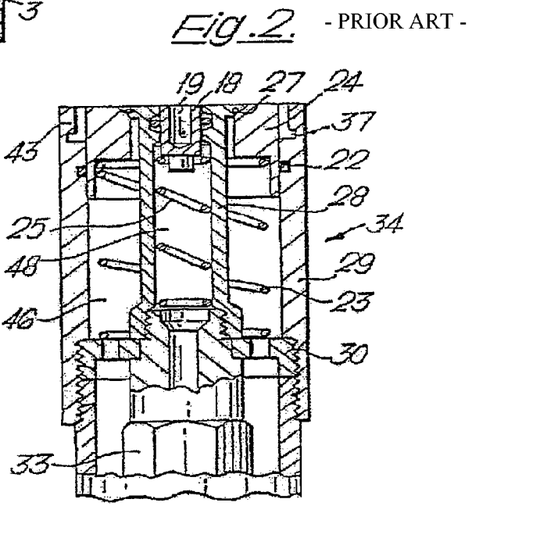
FIG. 2 shows a longitudinal section through the female part of a known coaxial coupling.

FIGS. 1 and 2 show a longitudinal section through the male part and the female part of a coaxial coupling, according to the prior art.

A first part 1 and a second part 34 consist of parts placed one inside the other, the internal pipes 2, 28 of which constitute a high-pressure line, that said moving parts are configured such that both the inner pipe 2 of the first part 1 and its outer pipe 5 are guided into the inner pipe 28 and outer pipe 29 respectively of the second part 34 in connection with the coupling, wherein the outer pipe 5 of the first part 1, in connection, after having been introduced into the second part 34, displaces a spring-loaded slide ring in the outer pipe 5 of the first part 1, so that, virtually immediately upon the coupling, a connection is established between the spaces, between the inner and outer pipes, of the first part 1 and of the second part 34, and that, upon continued introduction of the first part 1 into the second part 34, the inner pipe 2 of the first part 1, which at its outer end is closed, pushes a spring-loaded valve body 18 ahead of it in the inner pipe 28 of the second part 34, so that fluid under moderate pressure is introduced into the inner pipe 28 of the second part 34 through front holes 3 in the shell surface of the inner pipe 2 of the first part 1, which shell surface also has rear holes 12, which maintain a connection through the inner pipe 2 of the first part 1, and that, upon subsequent introduction of the first part 1 into the second part 34, the inner pipe 28 of the second part 34 pushes the annular slide 4 of the first part 1 over said rear holes 12 in the shell surface of the inner pipe 2 of the first part 1, so that pressurized fluid is introduced into the inner pipe 28 of the second part 34, and that the device is equipped with holding-together members, which at least in the longitudinal direction of the device maintain a stable connection between the first 1 and the second 34 part when these parts 1, 34 have been guided sufficiently far into each other that fully pressurized fluid is introduced into the second part 34.

The coaxial coupling consists of a male part 1 and a female part 34, which is shown in FIG. 2. The male part comprises the outer pipe sleeve 5 and the inner pipe sleeve 2, which at its front end is equipped with an end face 21 and a center pin 36.

The outer pipe sleeve 5 of the male part is at its front end provided with a sealing ring 38, which seals against an outer seal 20 of the slide ring 4 when said slide ring 4 is in its foremost position or in the position shown in FIG. 1. The seal 20 ensures that no fluid leaks out between the sealing ring 38 and the slide ring 4 when the coupling halves are not coupled together. A seal 31 simultaneously ensures that no leakage of fluid occurs between the cylindrical casing of the inner pipe sleeve 2 and the central hole through the slide ring 4. Once the coupling halves are disconnected, the slide ring 4 is held in its foremost position by means of a slide valve spring 8.

Together with a fastening sleeve 14, the inner pipe sleeve 2, together with the slide valve spring 8 and the slide ring 4, forms a slide valve 35. The inner pipe sleeve 2 is provided with a number of openings 3 in the front part of the inner pipe sleeve 2, which are open and are not therefore covered by the slide ring 4 when the coupling halves are coupled together. The inner pipe sleeve 2 is in its rear part equipped with a further number of openings 12, which are covered by the slide ring 4 when the coupling halves are coupled together.

A number of openings 13 arranged in a ring ensure the connection between a front chamber 44 and a rear chamber 45 for the return flow of the male part.

In FIG. 1 is also shown a high-pressure hose 16, which constitutes the internal hose in a coaxial hose having an outer hose 10. The space between the outer hose 10 and the high-pressure hose 16 is used as a return line. By means of a connecting part 15, the high-pressure hose 16 is connected to a high-pressure duct 11 in the slide valve 35.

The locking device for mechanically holding together the coupling halves comprises a holding-together sleeve 9 having a holding collar 9', a locking sleeve spring 7, and a locking sleeve 6, as well as two locking segments (not shown).

The female part 34 of the coupling, which is shown in FIG. 2, comprises an outer pipe sleeve 29 having a locking groove 37 and two locking flanges 43. An inner pipe sleeve of the female part has been denoted by 28. A sealing ring 24 is held in the front position shown in FIG. 2 by means of a compression spring 23. A seal 27 ensures that no leakage occurs between the sealing ring 24 and the inner pipe sleeve 28. A seal 22 ensures that no leakage occurs between the sealing ring 24 and the outer pipe sleeve 29.

A seal piston 18 is held in the front position shown in FIG. 2 by means of a compression spring 25. A seal (without reference symbol) ensures that no leakage occurs between the inner pipe sleeve 28 and the seal piston 18. Said seal and the seal 31, which are exposed to high pressure, can in principle be configured according to FIG. 1. If an O-ring is exposed to high pressure from a gap, it is prevented from being clamped in a gap by means of a back-up ring, which preferably can be made of harder material and which can be moderately elastic, for example Teflon. The O-ring can here be made of, for example, fluoric rubber, in which case good temperature resistance is simultaneously obtained. A center hole 19 on the seal piston 18 is used to center the coupling halves 34, 1 in relation to each other in connection with the coupling. The centering pin 36 is here introduced into the center hole 19. The threaded washer 30 holds the inner sleeve 28 centered in relation to the outer sleeve 29. The connecting part 33 connects up an inner chamber 48 of the female part to a high-pressure line.

When the fluid machine is running, the slide (not shown) is transferred to the right, whereupon a duct for the return flow, which is used when the machine is not in operation, is shut off, at the same time as a duct for the return flow is connected up to a return duct. The flow can therefore pass through the machine when the slide is guided over to the right. The machine can be started when the slide is guided over to the right.

When the coupling halves 1, 34 are coupled together, the inner and outer pipe sleeve 2, 5 of the male part are guided into the respective inner and outer pipe sleeve 28, 29 of the female part and the sealing ring 38 of the outer pipe sleeve 5 of the male part thereupon acts upon the sealing ring 24, which is pushed into the female part 34. After just a few tenths of a millimeter displacement of the sealing ring 24, a gap is opened between the sealing ring 24 and the inner pipe sleeve 28, whereupon a connection is formed between the front chamber of the male part for the return flow 44 and the front chamber of the female part for the return flow 46.

Upon continued introduction of the male part of the coupling into its female part, the valve piston 18 is pushed rearward into the inner pipe sleeve 28 of the female part, where it is held in central position by means of the center pin 36. The inner pipe sleeve 2 of the male part is also here guided into the inner chamber 48 of the female part. A connection between the inner chamber 48 of the female part and the high-pressure duct 11 in the inner pipe sleeve 2 of the male part is only established, however, once the openings 3 in the casing of the inner pipe sleeve 2 of the male part have been guided sufficiently far into the inner pipe sleeve of the female part that said openings 3 have passed said seal (without reference symbol). Once the openings 3 have passed the seal, the chamber 48 is in connection with the high-pressure duct 11. In the male part of the coupling, the high-pressure duct 11 continues, however, to be connected to the chamber 44 for the return flow, until a number of rear openings 12 in the shell surface of the inner pipe sleeve 2 have been covered by the slide ring 4.

At the same time as the inner pipe sleeve 2 of the male part forces its way into the inner pipe 28 of the female part, the slide ring 4 is pushed rearward along the inner pipe sleeve 2 of the male part so that it ends up covering the rear openings 12 in the casing of said inner pipe sleeve 2. The high-pressure flow ducts of the coaxial coupling are thus only in connection with each other and only the mechanical coupling remains.

FIGS. 3, 4a, 4b, 5a and 5b are described below, in which reference symbols show:

100 groove
101 aluminum rear part (of male part)
102 PTFE back-up ring
103 dust-protection cover
104 nipple pipe body
105 nipple pipe
106-112 O-ring
113 relief valve
114 PTFE seal
115 valve (steel sleeve)
116 stainless steel spring
117 stainless steel spring
118 steel sealing cone
119 U-ring
120 valve retainer
121 steel valve seat
122 valve (steel sleeve)
201 aluminum rear part (of female part)
202 back-up ring
203 stainless steel ball
204 coupling body
205 steel spacer sleeve
206 PVC dust-protection cover
207 aluminum locking sleeve
208-212 O-ring
213 steel pin
214 steel sleeve
215 spring
216 U-ring
217 valve
218 bypass valve
219 valve opener
300 front hole
301 rear hole
501 male part
502 female part
U space of female part A first part (otherwise referred to as the female part 502) and a second part (otherwise referred to as the male part 501) consist of moving parts placed one inside the other, the internal pipes 2, 105 (nipple pipes) of which constitute a high-pressure line, said moving parts being configured such that both the inner pipe 2 of the first part 502 and its outer pipe body 204 are guided into the inner pipe (nipple pipe) 105 and outer pipe (nipple pipe body) 104 respectively of the second part 501, in connection with the coupling.

Figure 3:
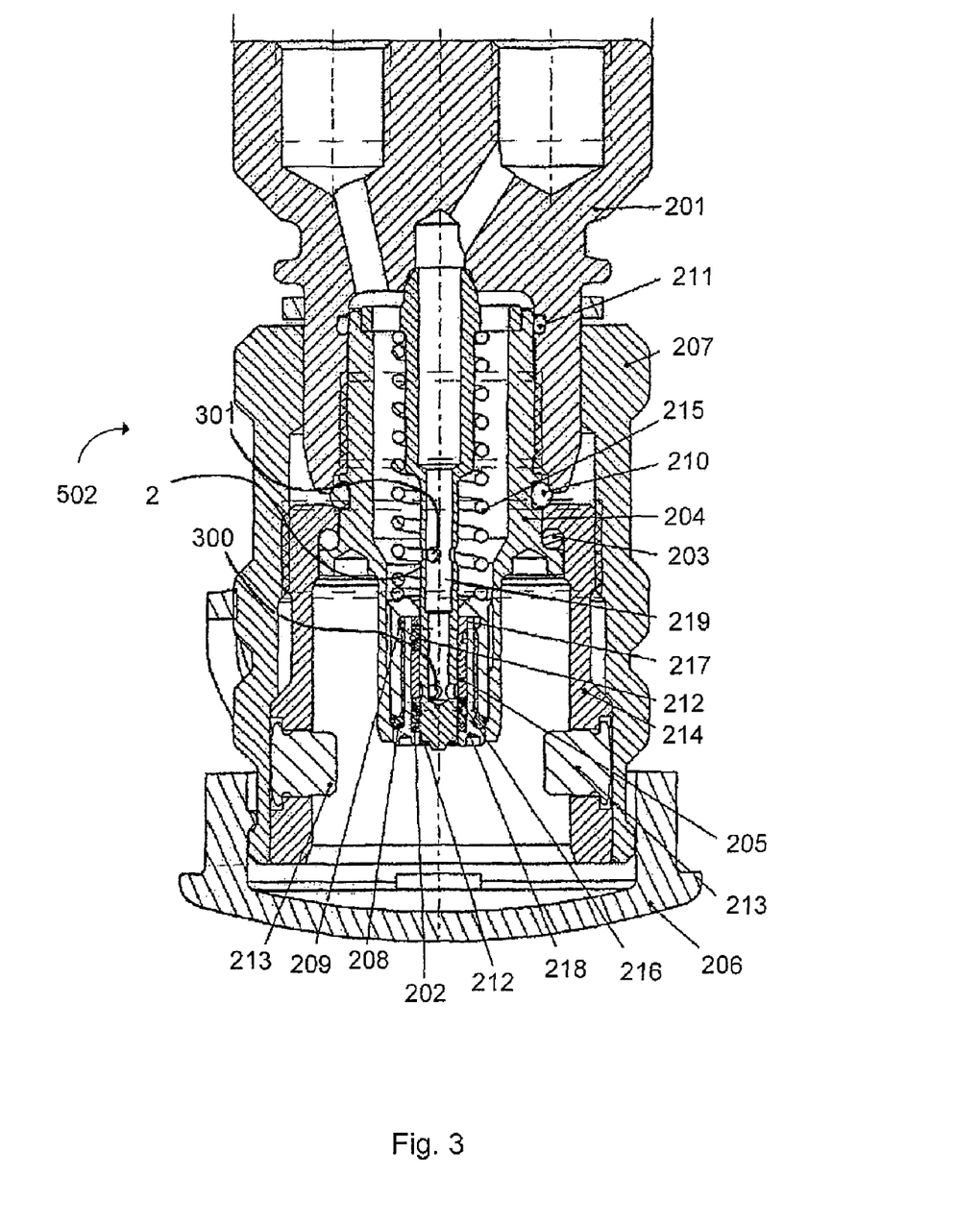
FIG. 3 shows a female part of a coaxial coupling according to one embodiment of the present invention.

In FIG. 3 it is shown how, through rotation of the pins 213 of the locking sleeve 207 (of the female part 502), a sufficiently high force is obtained to couple together the female and the male part 502, 501. The pins 213 run in helical grooves 100 on the nipple pipe body 104 (see FIG. 4a). With the rotation of the locking sleeve 207 of the female part 502 coupled to the sleeve 214 accommodating the pins 213 (preferably two in number), which rotation is manually effected by the user, the pins 213, when these pins 213 fall into the grooves 100, as a result of the rotation about an axis running along the coupling, will catch in the walls of the grooves 100 and cause the nipple pipe body 104 to be pulled into the female part 502. This rotation of the locking sleeve 207 has a force-transmitting function and said rotation of the pins 213 in the grooves 100, pulling the nipple pipe body 104 into the female part 502, generates a coupling force in the axial direction. As a result of this coupling and interlocking mechanism, a user can easily couple together the female part 502 and the male part 501, producing a coupling by rotation of the locking sleeve 207. That is to say, the coupling is realized by means of a bayonet form of the coupling mechanism.

In the rescue work, it is thus ensured that a pressure source (not shown) can be coupled to the female part 502, and the male part 501 (with tool) can be coupled with a simple maneuver to the female part 502.

A relief valve 113 (see FIG. 4b) arranged in the nipple pipe body 104 causes any residual pressure in the nipple to be discharged in the coupling and thus allows coupling. With said relief valve 113, connection is made directly possible without the need to use extra tools. Likewise, possible pressure oil spillage outside the system is eliminated, since, when connection is achieved, the excess ends up in the female part 502.

Figure 4A:
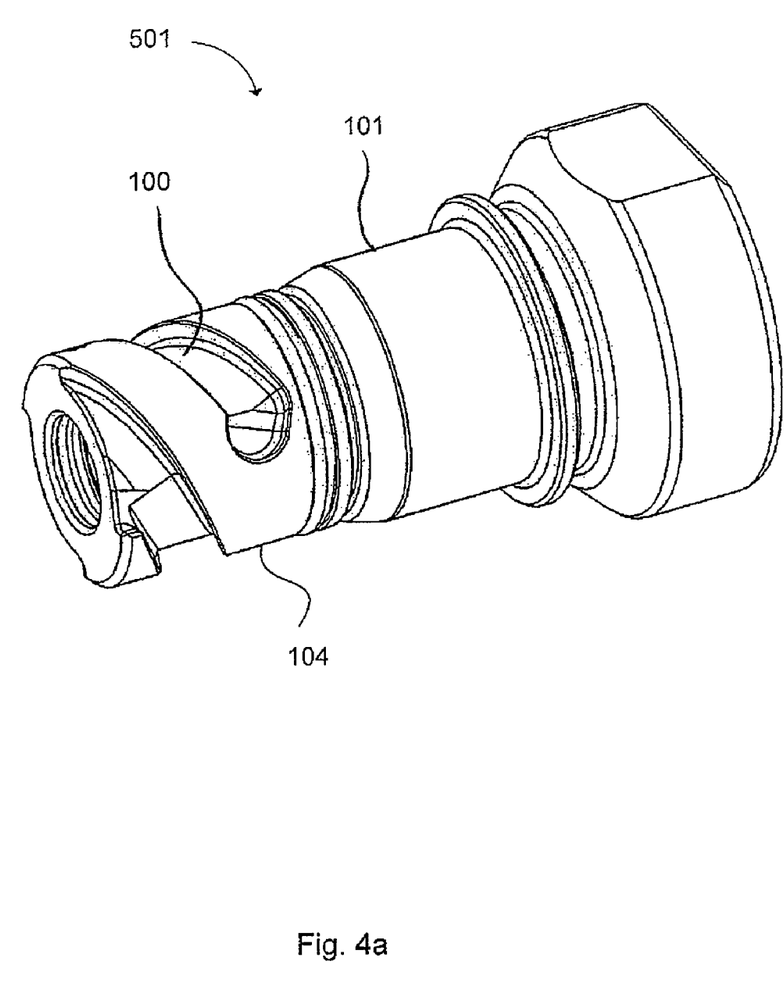
FIG. 4a shows in perspective a male part of a coaxial coupling according to this embodiment.
Figure 4B:
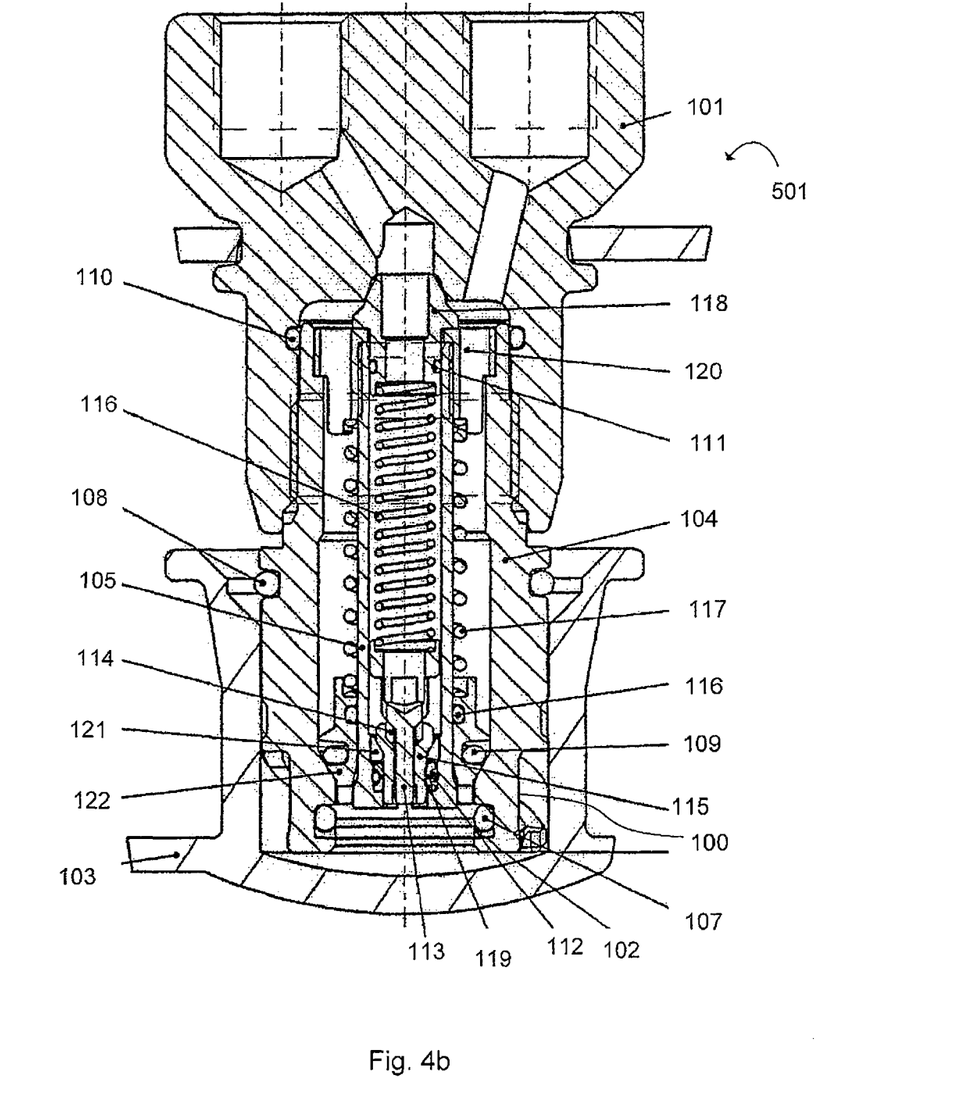

In the first stage of the connection, the end of the valve opener 219 (see FIG. 3) is pressed against the relief valve 113 (see FIG. 4b). The relief valve 113 is easily opened, since the sealing area is small against the seal 114 (see FIG. 4b) and discharges the pressurized oil against the valve 218 (FIG. 3). When the pressure is equalized, the two larger valves 122, 115 in the nipple (see FIG. 4b) can continue to be opened and the coupling can be completed.

Figure 5A:
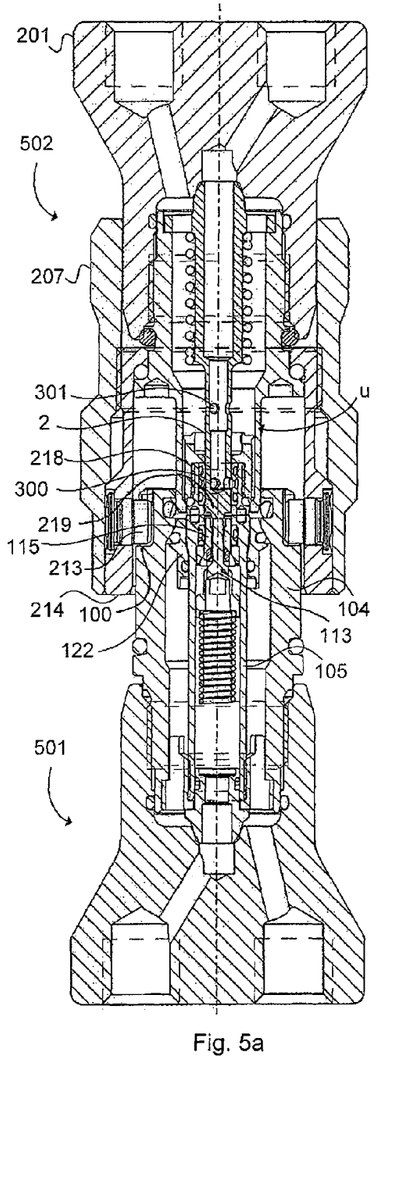
FIG. 5a shows the male part and the female part when they have just begun to be coupled together.
Figure 5B:
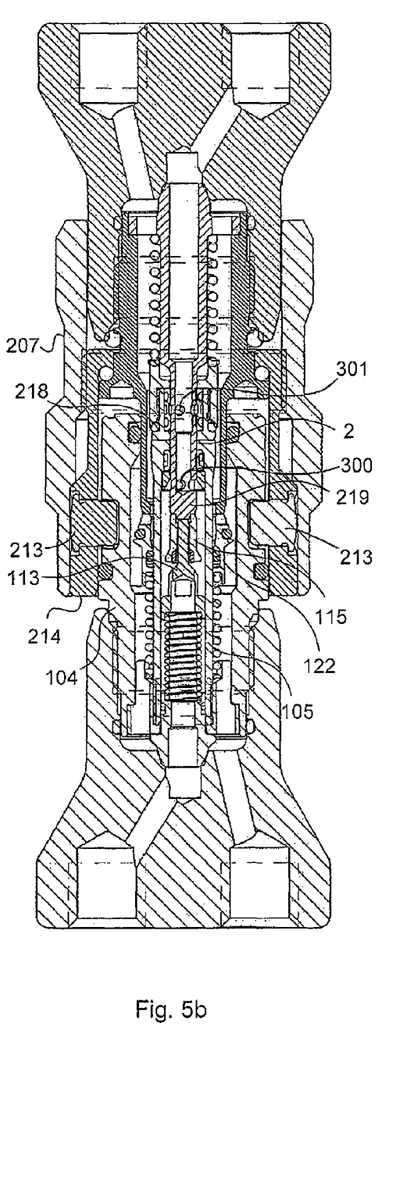
FIG. 5b shows completed rotation of the locking sleeve in the coupling operation.

FIG. 5a shows the coaxial coupling according to one embodiment, in which the male part 501 and the female part 502 have just begun the coupling. The pins 213 are fitted into the grooves 100 and the rotation of the locking sleeve 207 is begun. In this position, the valve opener 219 likewise comes up against the relief valve 113 and any fluid which might have expanded by the heat of the sun can "hiss" out to the space U of the female part 502. Oil is thus collected in the coupling without spillage and a user does not need to use as much force to couple together the coupling when the sun has heated the exposed male part 501 and given rise to high pressure of the oil enclosed therein, which male part 501 is coupled to the rescue tool. In FIG. 5b it is shown how completed rotation of the locking sleeve 207 and the pins 213 has been achieved. The pins 213 have guided in the nipple pipe body 104 and have created a large force in the axial direction by force transmission, surmounting the high pressure generated in the female part from the pressure source. Opening of the female part 502 by means of the male part 501 can now be done without the need to use great force.

Figure 6:
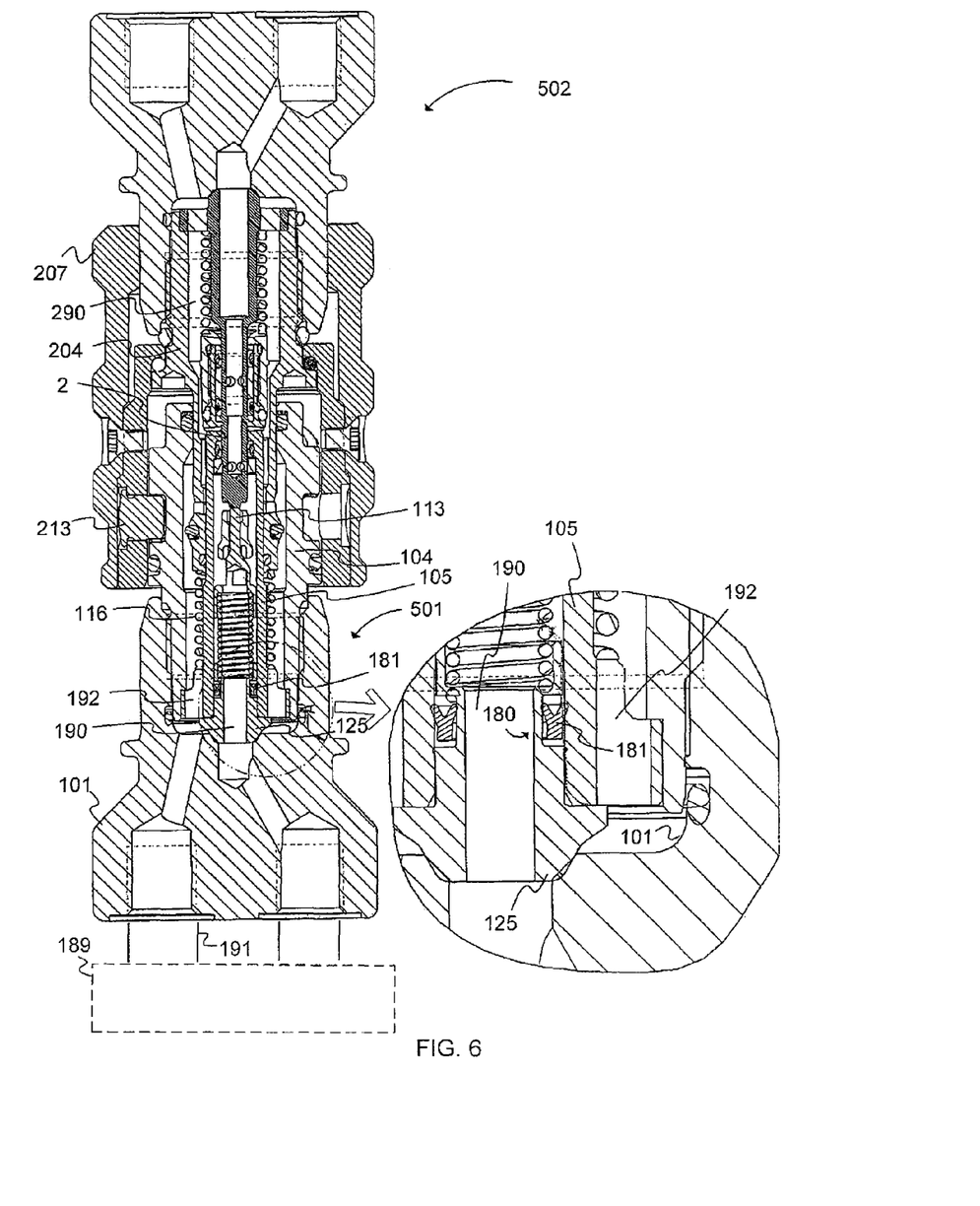
FIG. 6 shows a further embodiment.

FIG. 6 shows a further embodiment of the invention. A sealing cone 125 is arranged between the rear part 101 and an inner nipple pipe 105, which sealing cone serves as a seal between the nipple pipe and the rear part. The sealing cone 125 also acts as a brace against the spring 116, which presses the relief valve 113 in the direction away from the rear part 101. In previously shown embodiments, the sealing cone 125 has been sealed against the inner nipple pipe 105 by means of an O-ring. According to this now described embodiment, this O-ring has been replaced by a safety valve 180 configured as a collar 181. The collar 181 acts as a non-return valve and lets through pressurized oil only in one direction, that is to say in the direction away from the return duct to the pressure duct. The rubber collar 181 prevents the transmission of pressurized oil from the pressure duct 190 to the return duct 192 during normal operation. The annular collar 181 has a Y shape in a cross section, in which the two upper flanges of the "Y", are facing toward the pressure duct, acting as a seal when the pressure duct 190 is pressurized. Upon pressurization of the pressure duct 190, the flanges are pressed against the inner nipple pipe 105 and the shell surface of the sealing cone 125 facing toward the nipple pipe 105.

A hydraulically operated tool 189, such as a rescue tool (not shown), is coupled via a pressure or return hose 191 to the nipple portion (the male part 501). The male part 501 comprises the nipple pipe 105, which has an internal pressure duct 190 for pressurized oil which is fed from the pressure source via the female part 502 and the male part 501 to the tool 189. When coupling takes place for normal operation of the tool 189, a circulation is therefore produced in which oil is pumped from the pressure source "in no-load operation" through a pressure hose to the inner pipe 2 of the female part 502 and through this and on to the pressure duct 190 of the male part 501. After this, the oil continues its circulation past the tool to the return hose 191 of the tool and back via the return duct 192 of the male part 501 (between the nipple pipe 105 and the nipple pipe body 104) and the return duct 290 of the female part 502 (between the inner pipe 2 and the coupling body 204), continuing through a return hose (not shown) to the tank (not shown) of the pressure source. No-load/circulation pressure is normally 20-50 bar.

When a user then uses the tool and activates the valve (not shown) of the tool, the flow is totally restricted, which means that the pressure source provides full power and the pressure in the pressure line increases to about 700 bar. In the return duct 192, the pressure then falls to, in principal, 0 bar.

According to this now described embodiment, the O-ring has been replaced by the safety valve 180 configured as the collar 181. The collar 181 acts as a non-return valve and lets through pressurized oil only in one direction. That is to say, it allows the pressure increase in the pressure duct 190 without pressure being lost to the return duct 192.

For safety purposes, this embodiment has now been created for the axial coupling in which the collar 181 also acts to prevent damage to the male part 501 should a user connect the pressure hose and the return hose from the pressure source wrongly to the female part 502, that is to say should he mistakenly couple the pressure hose to the return duct 290 and the return hose to the pressure duct of the inner pipe 2. When the pressure source is active, the return duct 192 and 290 could then be pressurized up to 700 bar, if the collar 181 had not been arranged. Since the collar is configured such that it lets through the flow from the return duct 192 (in the event of incorrect coupling) to the pressure duct 190, the pressure will never be built up and damage to the male part or female part due to the high pressure can be avoided.

The Y-shaped cross section yields the effect that said flanges are bent toward each other when the return duct is pressurized and the flow is allowed to pass between the respective flange and the sealing cone 125 and the inner nipple pipe 105 to the pressure duct 190, avoiding damage to the return ducts of the male and female parts.

Thus, when the return duct 192 is not pressurized, the tool will not be able to be operated, but the user automatically notices that something is wrong and becomes aware of the faulty connection between the female part 502 and the pump. He can then change to the right connection without the male part 501 and the female part 502 needing to be replaced due to damage.

By virtue of this embodiment, a coaxial coupling has been produced which allows the coupling to be rapidly and simply connected to a pressure source without the user needing to search for a new male or female part, which would be the case if the return duct were pressurized due to the incorrect coupling and a part were damaged.

Other examples of embodiments exist within the scope of the present invention and the above-described illustrative solutions should not be regarded as limiting. For example, the inner pipe of the female part 502 can comprise a set of a plurality of front holes and a set of plurality of rear holes, which, in the coupling, maintaining connection between the coupling parts in the coupling. The rear holes serve for the passage of fluid when the female part is decoupled. That is to say, the rear holes serve as a connection between the pipe for incoming fluid and outside pipes in the female part for return fluid, when the female part is not put together with the male part and the pressure source is switched on.

What is claimed is:

1. A coaxial coupling comprising:
a male part and a female part, the male part can be fitted into the female part,
the coaxial coupling comprises a bypass valve located in the female part so that the female part can be decoupled from the male part while pressurized fluid passes through the female part, including incoming fluid and return fluid,
an inner pipe of the female part for pressurized fluid comprises at least one front hole and one rear hole, which holes are arranged for said bypass valve; the inner pipe and an outer pipe body of the female part are guided for coupling into a nipple pipe and a nipple pipe body of the male part,
wherein the nipple pipe of the male part pushes the bypass valve, which is spring-loaded, in the female part over said rear hole(s), so that pressurized fluid is introduced into the nipple pipe of the male part through relief valve located in the male part,
wherein the female part has a rotatable locking sleeve, which is coupled to a sleeve accommodating pins rotatable about the center axis of the female part, in that the nipple pipe body of the male part has helical grooves, wherein, upon said coupling and rotation of the locking sleeve, the pins, through rotation of the pins, when they fall into the grooves, catch in the walls of the grooves and cause the nipple pipe body of the male part to be pulled into the female part,
wherein when the male part and the female part are coupled together and the locking sleeve is begun to be rotated, one end of the inner pipe of the female part simultaneously meets a relief valve of the male part and opens the relief valve, and the pressurized fluid is discharged against the bypass valve of the female part prior to continued opening of two larger valves in the nipple pipe body of the male part in order to couple the male part to the inner pipe of the female part and separately connect the male part to the outer pipe body of the female part.

2. The coaxial coupling as claimed in claim 1, wherein the number of pins is two.

3. The coaxial coupling as claimed in claim 1, wherein the pressurized fluid is hydraulic oil.

4. The coaxial coupling as claimed in claim 1, wherein the male part is coupled to a rescue tool.

5. The coaxial coupling as claimed in claim 1, wherein the male part is coupled to a hydraulically operated tool.

* * * * *

UNITED STATES PATENT AND TRADEMARK OFFICE
CERTIFICATE OF CORRECTION

PATENT NO. : 8,387,949 B2  Page 1 of 1
APPLICATION NO. : 12/595181
DATED : March 5, 2013
INVENTOR(S) : Ekström et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 612 days.

Signed and Sealed this
First Day of September, 2015

Michelle K. Lee
*Director of the United States Patent and Trademark Office*